Oct. 8, 1929.  R. J. MONTGOMERY  1,730,980
WIRE STRIPPING TOOL
Filed Aug. 20, 1928  2 Sheets-Sheet 1
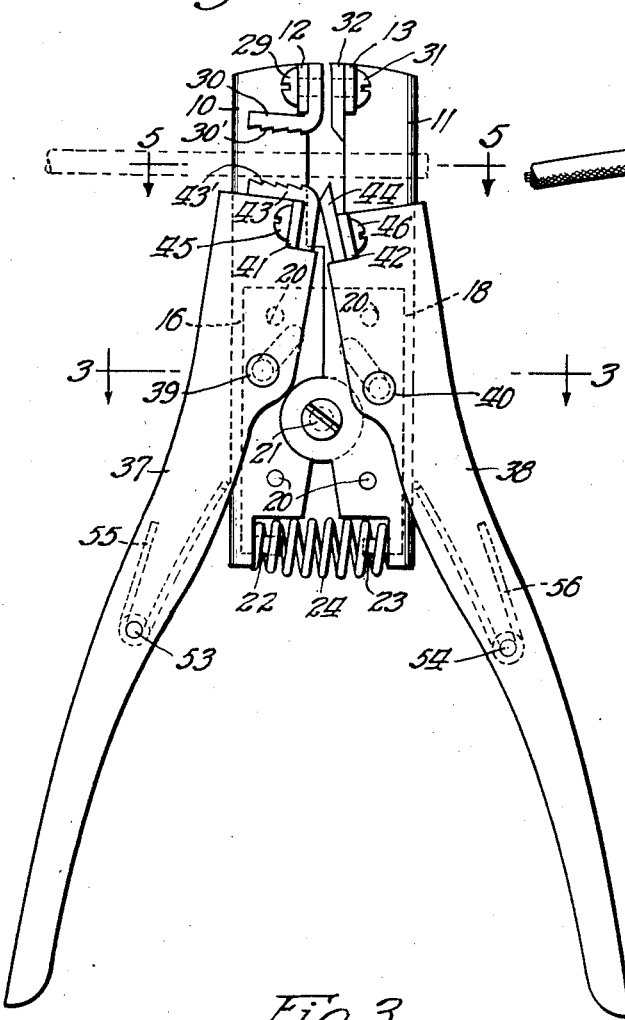
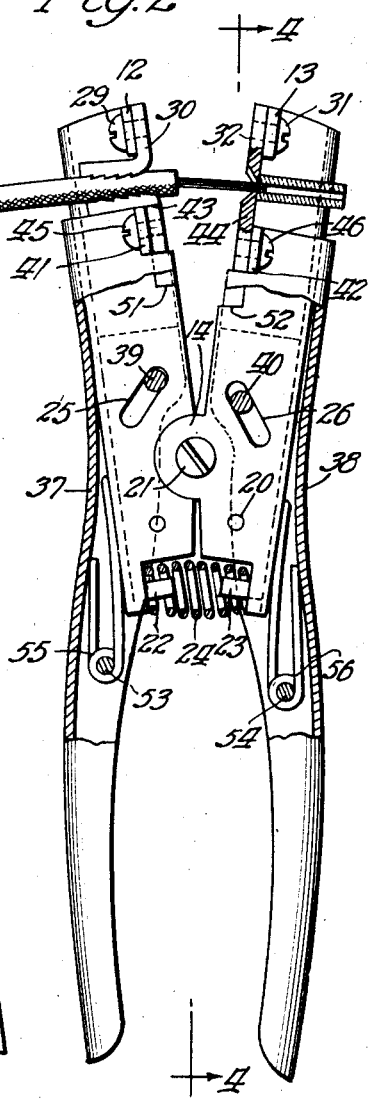
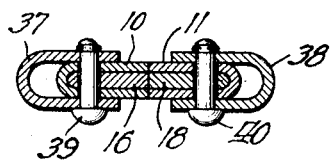
Inventor
Robert J. Montgomery
By Fisher, Clapp, Soans & Pond
Attys.

Oct. 8, 1929.  R. J. MONTGOMERY  1,730,980
WIRE STRIPPING TOOL
Filed Aug. 20, 1928   2 Sheets-Sheet 2
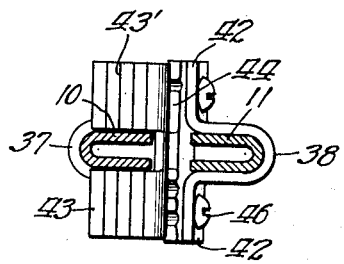
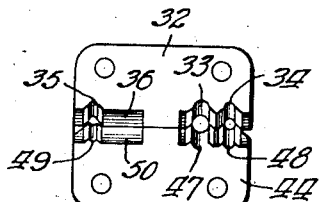
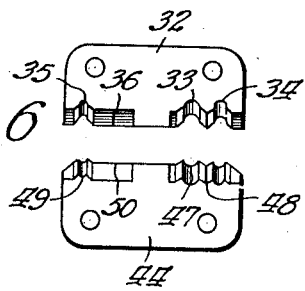
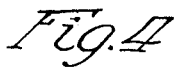
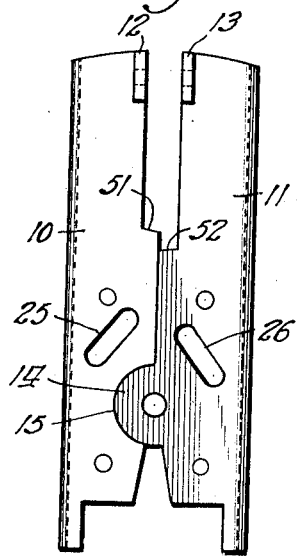
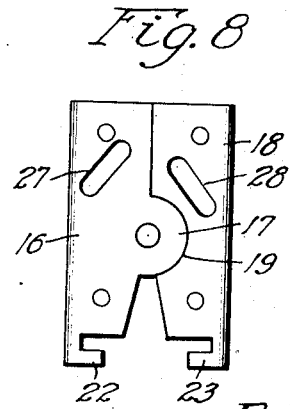
Inventor
Robert J. Montgomery
By Fisher, Clapp, Soans & Pond
Attys.

Patented Oct. 8, 1929

1,730,980

UNITED STATES PATENT OFFICE

ROBERT J. MONTGOMERY, OF CHICAGO, ILLINOIS

WIRE-STRIPPING TOOL

Application filed August 20, 1928. Serial No. 300,673.

This invention relates to a tool designed to cut and strip insulation from insulated wire, and has reference more particularly to a known type of such tools which are provided with a pair of wire clamping or gripping jaws, a pair of insulation cutting and stripping jaws, and handle levers so related to said jaws that the initial squeezing of the handle levers together functions to clamp the wire and cut the insulation and the continued further squeezing of the handle levers operates to spread the clamping jaws and the stripping jaws apart, thus moving the severed portion of the insulation lengthwise of the wire core. Examples of tools of this character are shown in patents to Wood, No. 1,151,319, August 24, 1915, and No. 1,196,322, August 29, 1916.

The principal objects of the present invention are to provide a stronger and more compact and rugged construction that will avoid side play between the pivoted members carrying the clamping and stripping jaws and between said jaw-carrying members and the handle levers, to increase the capacity of the tool, to reduce the spread of the handle levers, to make feasible the use of stampings in lieu of forged parts, and generally to improve, simplify, and cheapen the cost of tools of this character without any sacrifice of efficiency. One practical embodiment of the principle of the invention is illustrated in the accompanying drawings, in which—

Fig. 1 is a side elevation of the tool showing the handle levers and jaws in work-receiving position;

Fig. 2 is a similar view showing the relative positions of the parts at the conclusion of a wire stripping operation;

Fig. 3 is a cross-sectional detail taken on the line 3—3 of Fig. 1;

Fig. 4 is a vertical axial section taken on the line 4—4 of Fig. 2;

Fig. 5 is a horizontal section on the line 5—5 of Fig. 1;

Fig. 6 is a group view showing the stripping jaws in face elevation and separated;

Fig. 7 is a group view of the two opposed jaw carriers;

Fig. 8 is an elevation of a pair of filler strips occupying the inner portions of the jaw carriers.

Referring to the drawings, 10 and 11 designate a pair of opposed jaw carriers each of U-shape in cross-section, as clearly shown in Figs. 3 and 5, disposed with the inner open edges opposed to each other. On the outer ends of the jaw carriers 10 and 11 are laterally extending lugs 12 and 13 respectively which serve for the attachment of relatively stationary clamping and stripping jaws hereinafter referred to. For effecting a strong laterally rigid pivotal connection between the jaw carriers 10 and 11 I preferably employ the construction best illustrated as to detail in Figs. 4, 7 and 8, wherein it will be seen that the member 11 is formed on its inner edge with a pair of opposed apertured hinge lugs 14, and the mating member 10 is formed with a pair of notches 15 interfitting with the hinge lugs 14. A filler strip 16 shown in detail in Fig. 8 lies within the jaw carrier 10 and is formed on its inner edge with a projecting hinge lug 17 that lies between the hinge lugs 14; while the other jaw carrier 11 is supplied with a corresponding filler strip 18 formed on its inner edge with a notch 19 interfitting with the hinge lug 17. The filler strips are secured in place as by rivets 20, and the hinge lugs are united by a pivot bolt 21. On the lower ends of the filler strips 16 and 18 are inwardly extending lugs 22 and 23 which serve to mount and center the ends of a thrust spring 24, in the manner clearly shown in Figs. 1 and 2, this spring normally urging the jaw carriers 10 and 11 to closed position. Slightly outwardly of the pivot 21 the carriers 10 and 11 are formed with oppositely inclined cam slots 25 and 26 that register with corresponding slots 27 and 28 formed through the filler strips 16 and 18. Mounted on and crosswise of the outer end of the jaw carrier 10 and attached to the lugs 12 thereof as by screws 29 is a wire clamping or gripping jaw 30 formed with a serrated lower face 30'; and similarly mounted on and across the outer end of the jaw carrier 11, and secured to the lugs 13 as by screws 31 is a stripping jaw 32. As clearly shown in Figs. 4 and 6, the jaw 32 is formed on one side with a pair of insulation cutting notches 33 and 34 of relatively large and intermediate sizes and on its other side with a cutting notch 35 of small size and a wire cutting edge or blade 36.

37 and 38 designate a pair of handle levers each of U-shape in cross-section, the outer portions of which slidably embrace the jaw carriers 10 and 11 respectively. Mounted in the side walls of the handle lever 37 is a hardened roller pin 39 that extends through the registering slots 25 and 27 of the jaw carrier 10 and its filler strip 16; and similarly mounted in the handle lever 38 is a hardened roller pin 40 that extends through the registering slots 26 and 28 of the jaw carrier 11 and its filler strip 18. On the outer ends of the handle levers 37 and 38 are laterally extending lugs 41 and 42 respectively corresponding functionally to the lugs 12 and 13 and serving to support the inner cooperating clamping and stripping jaws 43 and 44 attached thereto by screws 45 and 46. The jaw 43 mates with the jaw 30, being serrated on its outer side as shown at 43', while the jaw 44 mates with the jaw 32 being formed on its upper edge with large, intermediate and small cutting notches 47, 48 and 49 and with a wire cutting edge or blade 50. It will be observed that the inner jaws 43 and 44 carried by the handle levers 37 and 38 extend across the inner opposed edges of the jaw carriers 10 and 11, and the said inner edges are cut away, as best shown in Fig. 7, to provide stop shoulders 51 and 52 that cooperate with the lower edges of the jaws 43 and 44 to limit the retracting movement of the handle levers 37 and 38.

Mounted on pins 53 and 54 in the handle levers 37 and 38 respectively are a pair of torsion springs 55 and 56 respectively, the shorter ends of which bear against the handle levers while the longer ends slidably engage the outer edges of the jaw carriers 10 and 11. After the jaw carriers 10 and 11 have been returned to closed position, the springs 55 and 56 act to retract the handle levers from the position shown in Fig. 2 to that shown in Fig. 1 and also to spread said levers to normal idle position.

In manipulating the tool, with the jaw carriers and handle levers in normal idle position shown in Fig. 1, the wire to be stripped is laid between the outer and inner pairs of clamping and stripping jaws in register with whichever pair of cutting notches is suited to the size of the wire. The handle levers are then squeezed together. The first part of the squeezing movement advances the handle levers due to the thrust of the fulcrum pins 39 and 40 on the inner inclined sides of the cam slots, the outer ends of the handle levers being prevented from swinging outwardly relatively to the jaw carriers by reason of the bearing of the jaws 43 and 44 on the inner edges of the jaw carriers. The wire is thus gripped between the jaws 30 and 43 and simultaneously the insulation is cut by the jaws 32 and 44. During the latter part of the handle squeezing operation the jaw carriers are spread on their pivot 21 against the thrust of the spring 24, thus stripping the severed portion of the insulation from the wire. On release of the handle levers the jaw carriers are first closed under the thrust of the spring 24, and the handle levers are then further spread and retracted under the thrust of the springs 55 and 56. The wire core itself may be cut by inserting the same between the cutting blades 38 and 50 and then compressing the handle levers.

The U-shaped form of the jaw carriers and handle levers affords a desirable combination of lightness and strength, and since the handle levers slidably embrace the jaw carriers for a considerable portion of their length, they are strongly supported against any lateral play. The described structure of hinged joint between the jaw carriers also provides a pivotal connection possessing a high degree of resistance to any looseness and side play; and the described manner of mounting the spring 24 maintains the latter always under compression and insures against accidental displacement thereof.

While I have herein shown and described a practical and highly efficient embodiment of the invention, it is manifest that minor variations in the form and relative arrangement of the cooperating parts may be resorted to without departing from the operative principle of the invention or sacrificing any of the advantages thereof. Hence, I do not limit the invention to the precise form illustrated, but reserve all such variations, modifications and mechanical equivalents as fall within the spirit and purview of the claims.

I claim:—

1. A wire stripping tool comprising in combination a pair of pivoted jaw carriers having wire clamping and stripping jaws mounted thereon respectively, a spring urging said jaws toward each other, a pair of handle levers slidable endwise on said carriers and equipped respectively with clamping and stripping jaws adapted to cooperate with said first-named clamping and stripping jaws, and means connecting said handle levers to said carriers serving, when said handle levers are squeezed together, to first advance said handle levers bodily lengthwise of said carriers and close said jaws on a wire inserted between them, and then spread said carriers.

2. A wire stripping tool, comprising in combination a pair of jaw carriers pivoted to each other, wire clamping and stripping jaws rigidly mounted on said carriers respectively, a spring urging said jaws toward each other, a pair of handle levers slidable on said carriers and equipped respectively with clamping and stripping jaws adapted to cooperate with said first-named clamping and stripping jaws, means connecting said handle levers to said carriers comprising cam slots in one of said parts and pins in the other cooperating with said slots, whereby, when said handle levers are squeezed together they first advance and close the jaws carried thereby on a wire inserted between the latter and said first-named jaws and then spread said carriers, and spring means for returning said handle levers to separate the handle lever jaws from the carrier jaws.

3. A wire stripping tool, comprising in combination a pair of jaw carriers pivoted to each other and formed with cam slots therein, wire clamping and stripping jaws rigidly mounted on said carriers respectively, a spring urging said jaws toward each other, a pair of handle levers having U-shaped portions embracing and slidable on said carriers, pins extending through the sides of said U-shaped portions and the slots of said carriers, clamping and stripping jaws rigidly mounted on said handle levers for cooperation with said first-named clamping and stripping jaws, and springs mounted on said handle levers and cooperating with said carriers to retract said handle levers and separate the jaws carried thereby from said first-named jaws.

4. A wire stripping tool, comprising in combination a pair of jaw carriers pivoted to each other intermediate their outer and inner ends, and formed with cam slots therein, wire clamping and stripping jaws rigidly mounted on the outer ends of said carriers respectively, a thrust spring between the inner ends of said carriers, a pair of handle levers having U-shaped portions embracing and slidable on said carriers, pins extending through the sides of said U-shaped portions and the slots of said carriers, clamping and stripping jaws rigidly mounted on the ends of said U-shaped portions for cooperating with said first-named clamping and stripping jaws, springs between said handle levers and carriers operative to retract said handle levers and withdraw the jaws carried thereby from said first-named jaws, and stops on said carriers effective to limit the retracting movement of said handle levers.

5. A wire stripping tool, comprising in combination a pair of jaw carriers pivoted to each other, a pair of clamping jaws mounted on opposite sides respectively of one of said carriers, a pair of stripping jaws mounted on opposite sides respectively of the other carrier opposite said clamping jaws, a spring urging said clamping and stripping jaws toward each other, a pair of handle levers slidable on said carriers, one of said handle levers carrying a pair of clamping jaws on opposite sides thereof respectively and the other handle lever carrying a pair of stripping jaws on opposite sides thereof respectively, and means connecting said handle members to said carriers operating, when said handle members are squeezed together, to first advance said handle members lengthwise of said carriers and close said jaws on a wire inserted between them, and then spread said carriers.

6. A wire stripping tool, comprising in combination opposed jaw carriers pivotally connected at their inner edges and formed with cam slots, wire clamping and stripping jaws mounted crosswise of the outer ends of said carriers respectively, handle levers slidable embracing said carriers, pins carried by said handle levers engaged with said cam slots, wire clamping and stripping jaws mounted crosswise of the outer ends of said handle levers and extending across the inner edges of said carriers, a spring urging said first-named jaws toward each other, and springs between said carriers and handle levers operative to retract and spread said handle levers.

7. A wire stripping tool, comprising in combination opposed jaw carriers pivotally connected at their inner edges between their outer and inner ends and formed with cam slots, wire clamping and stripping jaws mounted crosswise of the outer ends of said carriers respectively, handle levers slidably embracing said carriers, pins in said handle levers engaged with said cam slots, wire clamping and stripping jaws mounted crosswise of the outer ends of said handle levers and extending across the inner edges of said carriers, a thrust spring between the inner ends of said carriers, and springs mounted on said handle levers and slidably bearng on the outer edges of said carriers for retracting and spreading said handle levers.

8. A wire stripping tool, comprising in combination opposed jaw carriers of U-shape cross-section, the side walls of one of said carriers having apertured hinge lugs and the side walls of the other carrier having notches interfitting with said hinge lugs, a filler strip in said last-named carrier having an apertured hinge lug disposed between said first-named hinge lugs, a pivot pin extending through said hinge lugs, handle levers slidably mounted on said carriers, wire clamping and stripping jaws respectively mounted on the outer ends of said carriers, cooperating wire clamping and stripping jaws mounted on the outer ends of said handle levers, and means connecting said handle levers to said carriers serving, when said handle levers are squeezed together, to first advance said handle levers lengthwise of said carriers and close said jaws on a wire inserted between them, and then spread said carriers.

9. A wire stripping tool, comprising in combination opposed jaw carriers of U-shape cross-section, the side walls of one of said carriers having apertured hinge lugs and the side walls of the other carrier having notches interfitting with said hinge lugs, a filler strip in said last-named carrier having an apertured hinge lug disposed between said first-named hinge lugs and a spring centering lug on its inner end, another filler strip in said first-named carrier having a notch interfitting with said last-named hinge lug and a spring centering lug on its inner end, a pivot pin connecting said hinge lugs, handle levers slidably mounted on said carriers, wire clamping and stripping jaws respectively mounted on the outer ends of said carriers, cooperating wire clamping and stripping jaws mounted on the outer ends of said handle levers, a thrust spring mounted at its ends on said centering lugs, and means connecting said handle levers to said carriers serving, when said handle levers are squeezed together, to first advance said handle levers lengthwise of said carriers and close said jaws on a wire inserted between them, and then spread said carriers against the thrust of said spring.

10. A wire stripping tool, comprising in combination opposed jaw carriers of U-shape cross-section pivotally connected at their adjacent edges and formed with laterally extending lugs on their outer ends, wire clamping and stripping jaws respectively attached to the lugs of said carriers and lying crosswise of the inner edges of the latter, a pair of handle levers respectively embracing the outer edges and sides of said carriers and formed with lateral lugs on their outer ends, cooperating clamping and stripping jaws attached to the lugs of said handle levers crosswise of the latter and extending across the inner edges of said carriers, means for mounting said handle levers on said carriers with capacity of combined sliding and pivotal movement, a spring normally urging said carriers to closed position, and springs between said handle levers and carriers tending to both retract and spread said handle levers.

ROBERT J. MONTGOMERY.